United States Patent

[11] 3,564,238

| [72] | Inventors | William J. Martin;<br>Charles R. Ruppe, Spartanburg, S.C. |
|---|---|---|
| [21] | Appl. No. | 636,708 |
| [22] | Filed | May 8, 1967 |
| [45] | Patented | Feb. 16, 1971 |
| [73] | Assignee | Deering Milliken Research Corporation<br>Spartanburg, S.C. |

[54] IRRADIATION APPARATUS IN COMBINATION WEB HANDLING MEANS
10 Claims, 1 Drawing Fig.

| [52] | U.S. Cl. | 250/49.5 |
|---|---|---|
| [51] | Int. Cl. | G21f 7/00 |
| [50] | Field of Search | 250/49.5(7) |

[56] References Cited
UNITED STATES PATENTS
2,858,442  10/1958  Dewey II.................. 250/49.5

*Primary Examiner*—William F. Lindquist
*Attorneys*—Norman C. Armitage and H. William Petry

ABSTRACT: A system for continuously irradiating chemically treated material which employs an improved arrangement for permitting multiple passes of the treated material through the irradiation field while the distance between the layers of treated material passing through the field is maintained to improve the efficiency of the irradiation process. Ionizing irradiation apparatus is also included.

PATENTED FEB 16 1971
3,564,238
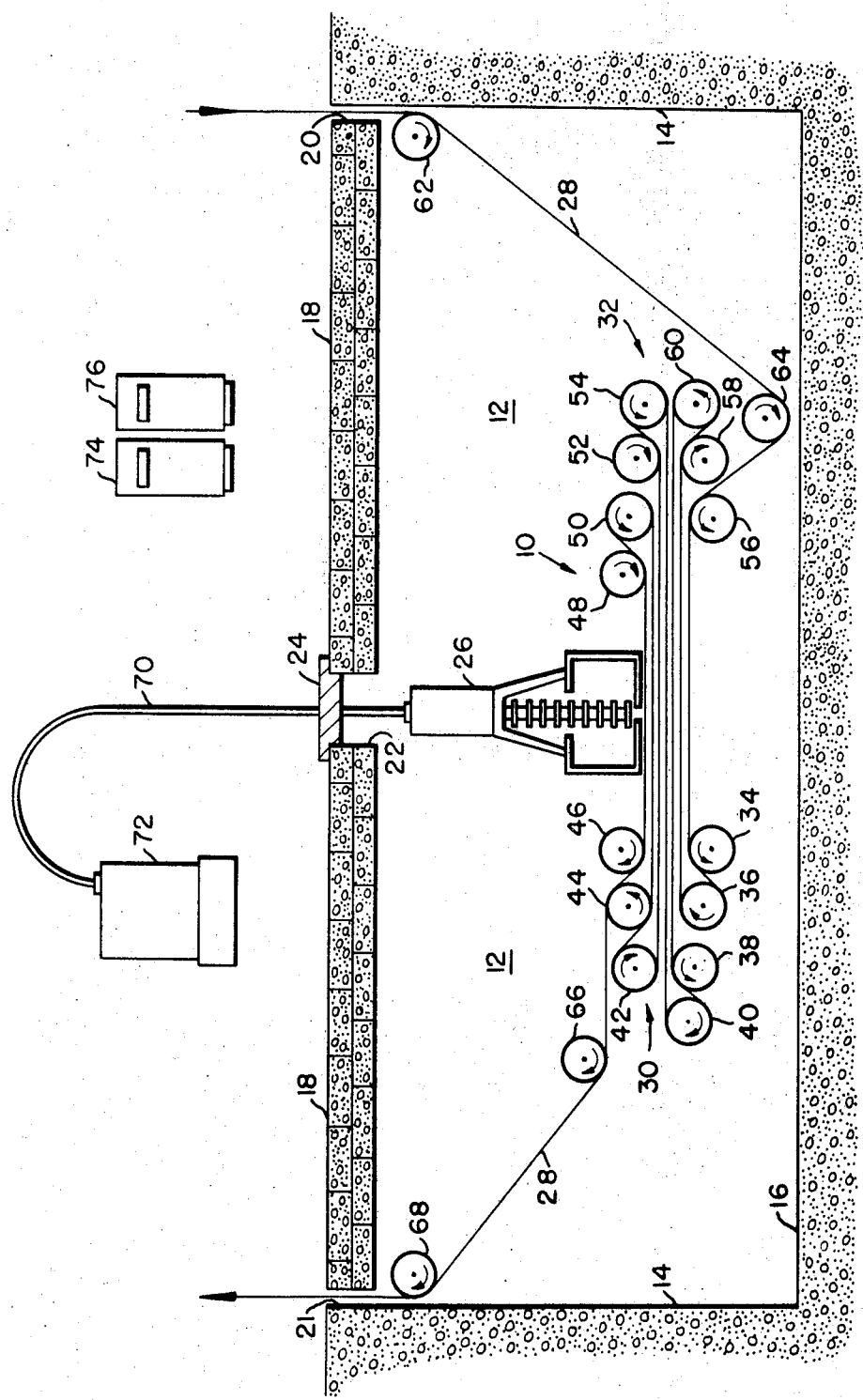
INVENTORS
WILLIAM J. MARTIN
CHARLES R. RUPPE
BY
Earle R. Marden
ATTORNEY

IRRADIATION APPARATUS IN COMBINATION WEB HANDLING MEANS

BACKGROUND OF THE INVENTION

The present invention is concerned with a process for irradiating chemically treated material particularly by the use of ionizing irradiation. Since the inception of irradiation chemistry some decades ago, great strides have been made in developing uses for irradiation techniques. For instance, irradiation presently finds extensive use in the field of organic chemistry where it is used for polymerization of numerous monomers, crosslinking of polymers, activation of surfaces for bonding, curing of resins, and numerous other related uses. Likewise, irradiation has found accepted use for the sterilization of food stuffs as well as the treatment of various and sundry substrates for various and sundry reasons. Of recent vintage in the applicability of irradiation techniques in the textile industry, and this is the industry to which the present invention particularly pertains. More specifically, in the textile industry, numerous chemical agents are applied to textile materials such as yarn, filaments, woven fabrics, nonwoven fabrics, knit goods and the like. These chemicals may or may not be susceptible to an irradiation treatment. In the event, however, the chemicals are susceptible to irradiation treatment they may be then subjected to irradiation for various purposes. Several of these purposes include the application of monomers to the textile substrate after which the substrate is irradiated to polymerize and/or crosslink the polymers formed thereon; the application of polymers to the textile substrate for cross linking and/or bonding of the polymers to the substrate; the direct irradiation of the textile substrate for the purposes of activation if the substrate after which various monomers or polymers may be added which will react with the substrate as long as activated free radicals are present or for the purpose of sterilization of the substrate, etc.

Prior to the invention numerous systems and festoon arrangements have been employed to handle multiple passes of material through various treatment devices. An example of such an apparatus is shown in U.S. Pat. No. 2,858,442 to Dewey and probably represents the current state of the art which is cumbersome, takes up too much floor space and therefore has a lower overall efficiency.

It is therefore an object of the invention to provide a multipass treatment chamber with an improved arrangement of the material handling rolls.

Another object of the invention is to provide a compact festoon arrangement which requires less floor and is more efficient.

Other objects and advantages will be clearly apparent as the specification proceeds to describe the invention with reference to the accompanying drawing in which the drawing represents a partial cross-sectional view of an irradiation apparatus employing the preferred festoon arrangement of the present invention.

Looking now to the drawing, the improved festoon arrangement generally designated 10, is located in an irradiation pit 12 defined by concrete walls 14 and bottom 16. Walls 14 and bottom 16 can contain or be lined with suitable radiation protective material such as lead. A top 18 of concrete blocks or other suitable material covers the top of the pit 12 and is provided with an entrance opening 20 for the ingress of the material to be irradiated and an exit opening 21. Located centrally of the top 18 is an opening 22 covered by a lead access cover 24 through which projects an acceleration tube 26 to provide a continuous stream of electrons to the material 28 to be irradiated.

Ionizing irradiation, like any source of irradiation, is limited to a particular penetration depth. Hence it is necessary to arrange the material to be irradiated in such a manner that when multiple layers are being exposed to the irradiation field that the lowermost layer will be effected by the ionizing irradiation. For best utilization of the radiation energy enough layers should be provided to absorb all of the electrons. Preferably, in a multipass irradiation festoon arrangement all the distance between adjacent layers of fabric in the irradiation zone are substantially equal. In the preferred form of the invention such distance should be a minimum of one-half inch for maximum efficiency. Also, it has been found that for most efficient irradiation of the material 28 that the material in the radiation zone travel in a substantially upward direction or downward direction from pass to pass and not be directed downwardly or upwardly, respectively away from the irradiation beam for any substantial distance, depending on whether the fabric entered the festoon arrangement from the bottom or top.

As previously mentioned one of the objects of the invention is to provide the maximum number of passes in the minimum pit cross-sectional area. In the prior art, such as shown in the above-mentioned U.S. Pat. No. 2,858,442 each additional pass through the irradiation zone requires additional pit width since the rolls of each successive next adjacent pass are located outward from the rolls of the previous path. The festoon arrangement 10 of the herein disclosed invention accomplishes the same result with an arrangement which substantially reduces the necessary width of pit required to produce an equivalent result on the material to be irradiated.

In the form of the invention shown on the drawing of the festoon arrangement consist of two banks of rolls 30 and 32 with an equal number of rolls in each bank. The bank of rolls 30 consists of a lower set of rolls 34, 36, 38 and 40 and an upper set of rolls 42, 44 and 46. The bank of rolls 32 consist of an upper set of rolls 48, 50, 52 and 54 and lower set of rolls 56, 58 and 60. The axis of each roll in each set is vertically spaced from the next adjacent roll in the set a distance equal to the predetermined distance between each pass of the material which in the preferred form is one-half inch. The axis of roll 54 in bank 32 is spaced vertically from the axis of roll 40 in bank 30 a distance equivalent to the diameter of roll 40 or roll 54 to maintain the proper spacing between the pass between rolls 60 and 40 and the pass between roll 40 and 54.

To reduce the overall width of the festoon arrangement the axis of the lower sets of rolls in both the banks 30 and 32 are spaced outwardly from the next previous roll in the set while the axis of the upper sets of rolls in both the banks 30 and 32 are spaced inwardly toward the next previous roll thereby providing a multipass festoon in which the rolls of one pass lie physically above and/or inwardly of the rolls of a previous pass resulting in a festoon arrangement shorter in overall width than prior art festoon arrangements.

In should be particularly noted that the herein disclosed arrangement requires that the entrant set of rolls and the exit set of rolls be an odd number of rolls. In the embodiment shown the entrant set of rolls consists of rolls 56, 58 and 60 and exit set of rolls consists of rolls 42, 44 and 46.

In the disclosed form of the invention it is contemplated that all the rolls shown shall be idler rolls, the material 28 being motivated by the takeup roll (not shown) but it is within the scope of the invention that any of the rolls can be separately or in combination driven by a separate drive means, if desired, to provide more positive drive.

OPERATION

The web of material 28, coated with a chemical reactive to irradiation, is supplied to the festoon arrangement through entrance opening 20 to the roll 56 over suitable idler rolls 62 and 64. From roll 56 the web follows a sinuous path back and forth across the irradiation zone guided by the various rolls as shown. At the end of the last pass the web of material passes under roll 46, over idler rolls 66 and 68 and is taken up by any suitable takeup mechanism.

The particular irradiation system is only represented schematically since it is not, per se, a part of the invention. As shown the basic irradiation system consists of the accelerator 26, a flexible cable 70 which provides communication between the power supply 72 and the accelerator 26 and two control consoles 74 and 76 to control the power and the accelerator. In brief, line voltage is stepped up by the power supply 72 and the electrons are emitted from the cathode into the accelerator where the electrons are stepped up to an extremely high voltage and are accelerated toward ground potential. The electron beam is then scanned by the use of electromagnetic coils in the accelerator and emerges therefrom through a thin metal window of titanium or other suitable material and impinges on the material to be irradiated causing the desired effect on the material passing through the pit 12.

The present festoon arrangement thus has the following advantages over the prior art. The arrangement of pulleys is much more compact and hence requires less pit space than was heretofore required. Moreover, in a much smaller pit space, when using the present festoon arrangement, there is still more available work space for manipulation of the pulleys, maintenance work to the vacuum chamber or to the radiation source in general, etc. This reduction in required space decreases the capital expenditure required for installation, reduces the area that is subjected to radiation and hence reduces the chance of injury due to escaping radiation, etc. Moreover, the present festoon arrangement allows optimum irradiation conditions to be continually maintained. Specifically the rolls can be altered as to number and/or pitch to accommodate any particular system to produce the desired distance between layers to be irradiated and the overall distance of the material (1) from the radiation source (2) and the total thickness of the composite thickness to be irradiated.

Although I have described in detail the preferred embodiment of my invention, I contemplate that many changes may be made without departing from the scope or spirit of my invention, and I desire to be limited only by the claims.

We claim:

1. Apparatus for continuously passing a web of material through a treatment zone having a means to supply a web of material to said zone, means to take up material from said zone and a festoon arrangement in said zone causing said web to pass through a multiplicity of passes in said zone, said festoon arrangement comprising; at least two banks of roll members, said web material passing alternately from one bank to the other bank during passage through said treatment zone, said banks each having at least two sets of rolls, each of said rolls having an axis of rotation, means mounting the axes of the rolls of one set of rolls in each bank so that each axis the direction of travel of said web material is further away from the center of said zone than the preceding axis in said set and means mounting the axes of the other sets of rolls in each bank so that in the direction of travel of said web material each axis in said other sets are closer to the center of said zone than the preceding axis in the respective set.

2. The structure of claim 1 wherein at least one set of rolls in each bank contains only an odd number of rolls.

3. The structure of claim 2 wherein said sets with an odd number of rolls contain the first roll and the last roll to be contacted by said web material in said zone.

4. The structure of claim 1 wherein the axis of each roll in each set is vertically displaced from the next adjacent roll in the set approximately one-half inch.

5. The structure of claim 1 wherein said festoon arrangement contains sufficient rolls to provide at least five passes of said web material through said zone.

6. Apparatus for irradiating a web of chemically treated material comprising; means forming a treatment chamber, an electron scanning beam apparatus projecting into said chamber, a festoon arrangement in said chamber below said scanning beam apparatus, means supplying a web of material to said festoon means taking said web of material away from said festoon arrangement, said festoon arrangement having at least two banks of roll members, said web material passing alternately from one bank to the other bank during passage through said chamber, said banks of roll members being so arranged that the space between all adjacent passes of web material is substantially equal, said banks of roll members each having at least two sets of rolls, each of said rolls having an axis of rotation, means mounting the axes of the rolls of one set in each bank so that each axis in the direction of travel of said web material is further away from the center of said chamber than the preceding axis in said set and means mounting the axes of the other sets of rolls in each bank so that in the direction of travel of said web material each axis in said other sets are closer to the center of said chamber than the preceding axis in the respective set.

7. The structure of claim 6 wherein at least one set of rolls in each bank contains only an odd number of rolls.

8. The structure of claim 7 wherein said sets with an odd number of rolls contain the first roll and the last roll to be contacted by said web material in said chamber.

9. The structure of claim 6 wherein the axis of each roll in each set is vertically displaced from the next adjacent roll in the set approximately one-half inch.

10. The structure of claim 6 wherein said festoon arrangement contains sufficient rolls to provide at least five passes of said web material through said chamber.